US011173886B2

(12) United States Patent
Kaneko

(10) Patent No.: US 11,173,886 B2
(45) Date of Patent: Nov. 16, 2021

(54) HYDRAULIC CONTROL DEVICE AND BRAKE CONTROL DEVICE

(71) Applicant: HITACHI AUTOMOTIVE SYSTEMS, LTD., Hitachinaka (JP)

(72) Inventor: Susumu Kaneko, Isesaki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/331,101

(22) PCT Filed: Aug. 23, 2017

(86) PCT No.: PCT/JP2017/030013
§ 371 (c)(1),
(2) Date: Mar. 6, 2019

(87) PCT Pub. No.: WO2018/055968
PCT Pub. Date: Mar. 29, 2018

(65) Prior Publication Data
US 2019/0232933 A1 Aug. 1, 2019

(30) Foreign Application Priority Data
Sep. 20, 2016 (JP) .............................. JP2016-182560

(51) Int. Cl.
*B60T 8/36* (2006.01)
*B60T 8/34* (2006.01)
(Continued)

(52) U.S. Cl.
CPC ................ *B60T 8/344* (2013.01); *B60T 8/34* (2013.01); *B60T 8/3675* (2013.01); *F16B 5/07* (2013.01);
(Continued)

(58) Field of Classification Search
CPC ........ B60T 8/3675; B60T 8/363; F16K 31/06; H01F 27/325; H01F 27/30; H01F 27/303; H01F 27/306
See application file for complete search history.

(56) References Cited

U.S. PATENT DOCUMENTS 5,449,227 A * 9/1995 Steinberg .............. B60T 8/3675
251/129.15
5,452,948 A * 9/1995 Cooper ............... B60R 16/0239
303/119.3
(Continued)

FOREIGN PATENT DOCUMENTS

DE 19644963 A1 5/1997
DE 19612907 A1 10/1997
(Continued)

OTHER PUBLICATIONS

Machine translation of EP 2703241 (no date).*
(Continued)

*Primary Examiner* — Nicholas J Lane
(74) *Attorney, Agent, or Firm* — Foley & Lardner LLP

(57) ABSTRACT

A hydraulic control device includes: a plurality of coil assembles each including a coil bobbin, and a yoke which has a cylindrical shape, and which receives the coil bobbin; a case including a bottom wall, and receiving the coil assemblies arranged on one side of the bottom wall; a wall portion protruding from an end surface of the coil bobbin in an axial direction of the coil bobbin, within a projection surface obtained by projecting an outer shape of the yoke in the axial direction of the coil bobbin; a first engagement portion provided to the wall portion; and a second engagement portion provided to the case, and arranged to be engaged with the first engagement portion.

8 Claims, 15 Drawing Sheets

(51) Int. Cl.
  *F16K 27/02* (2006.01)
  *F16K 31/06* (2006.01)
  *F16B 5/07* (2006.01)
  *F16K 27/00* (2006.01)
  *H01F 7/16* (2006.01)

(52) U.S. Cl.
  CPC ............ *F16K 27/00* (2013.01); *F16K 27/029* (2013.01); *F16K 31/06* (2013.01); *H01F 7/16* (2013.01)

(56) References Cited

U.S. PATENT DOCUMENTS

| | | | |
|---|---|---|---|
| 5,513,905 A | 5/1996 | Zeides et al. | |
| 6,000,679 A * | 12/1999 | Reuter | B60T 8/3675 137/884 |
| 6,164,732 A | 12/2000 | Tominaga et al. | |
| 6,616,249 B2 * | 9/2003 | Han | B60T 8/3675 251/129.15 |
| 2008/0142750 A1 * | 6/2008 | Tsuruta | B60T 8/3675 251/129.15 |
| 2018/0035555 A1 | 2/2018 | Kaneko | |

FOREIGN PATENT DOCUMENTS

| | | | | |
|---|---|---|---|---|
| DE | 10295687 T5 | 4/2004 | | |
| EP | 2703241 A1 * | 3/2014 | ............ | H01F 5/04 |
| JP | H07-215192 | 8/1995 | | |
| JP | H11-180275 | 7/1999 | | |
| JP | 2010-184565 A | 8/2010 | | |
| JP | 2010-234826 | 10/2010 | | |
| JP | 5261223 B2 * | 8/2013 | | |
| JP | 2016-174112 A | 9/2016 | | |

OTHER PUBLICATIONS

Machine translation of JP 5261223 (no date).*
Office Action issued in corresponding German Patent Application No. 11 2017 004 711.0 dated Oct. 21, 2019 with English translation.

* cited by examiner

US 11,173,886 B2

HYDRAULIC CONTROL DEVICE AND BRAKE CONTROL DEVICE

TECHNICAL FIELD

This invention relates to a hydraulic control device in which a plurality of coil assemblies each having a coil bobbin and a yoke are received within a case, and to a brake control device using this hydraulic control device.

BACKGROUND ART

A patent document 1 discloses a brake hydraulic control device for a vehicle, as one example of a hydraulic control device in which a plurality of coil assemblies are received within a case. In this device, the case includes a plurality of support portions each including a claw portion provided at a tip end, for holding the coil assemblies in the case. These plurality of the support portions retain peripheries of the coil assemblies.

In the above-described configuration, each of the arm-shaped support portions each holding the coil assembly is positioned outside the yoke of the coil assembly. That is, the arm-shaped support portion extends to a position at which the support portion is overlapped with the yoke in the axial direction of the coil bobbin. Accordingly, when the many coil assemblies are disposed within the case, a space occupied by the coil assemblies including the support portion becomes large, so that the size reduction of the device is deteriorated.

PRIOR ART DOCUMENT

Patent Document

Patent Document 1: Japanese Patent Application Publication No. 2010-184565

SUMMARY OF THE INVENTION

A hydraulic control device according to one aspect of the present invention comprises: a plurality of coil assembles each including a coil bobbin, and a yoke which has a cylindrical shape, and which receives the coil bobbin; a case receiving the coil assemblies arranged on one side of the bottom wall; a wall portion protruding from an end surface of the coil bobbin in an axial direction of the coil bobbin, within a projection surface obtained by projecting an outer shape of the yoke in the axial direction of the coil bobbin; and a first engagement portion of the wall portion, and a second engagement portion of the case arranged to be engaged with each other.

By this invention, when the many coil assemblies are disposed within the case, the space occupied by the coil assemblies becomes small. Accordingly, it is possible to attain the size reduction of the device.

DESCRIPTION OF EMBODIMENTS

Hereinafter, a brake control device for a vehicle according to one embodiment of the present invention is explained in detail with reference to the drawings.

Figure 1:
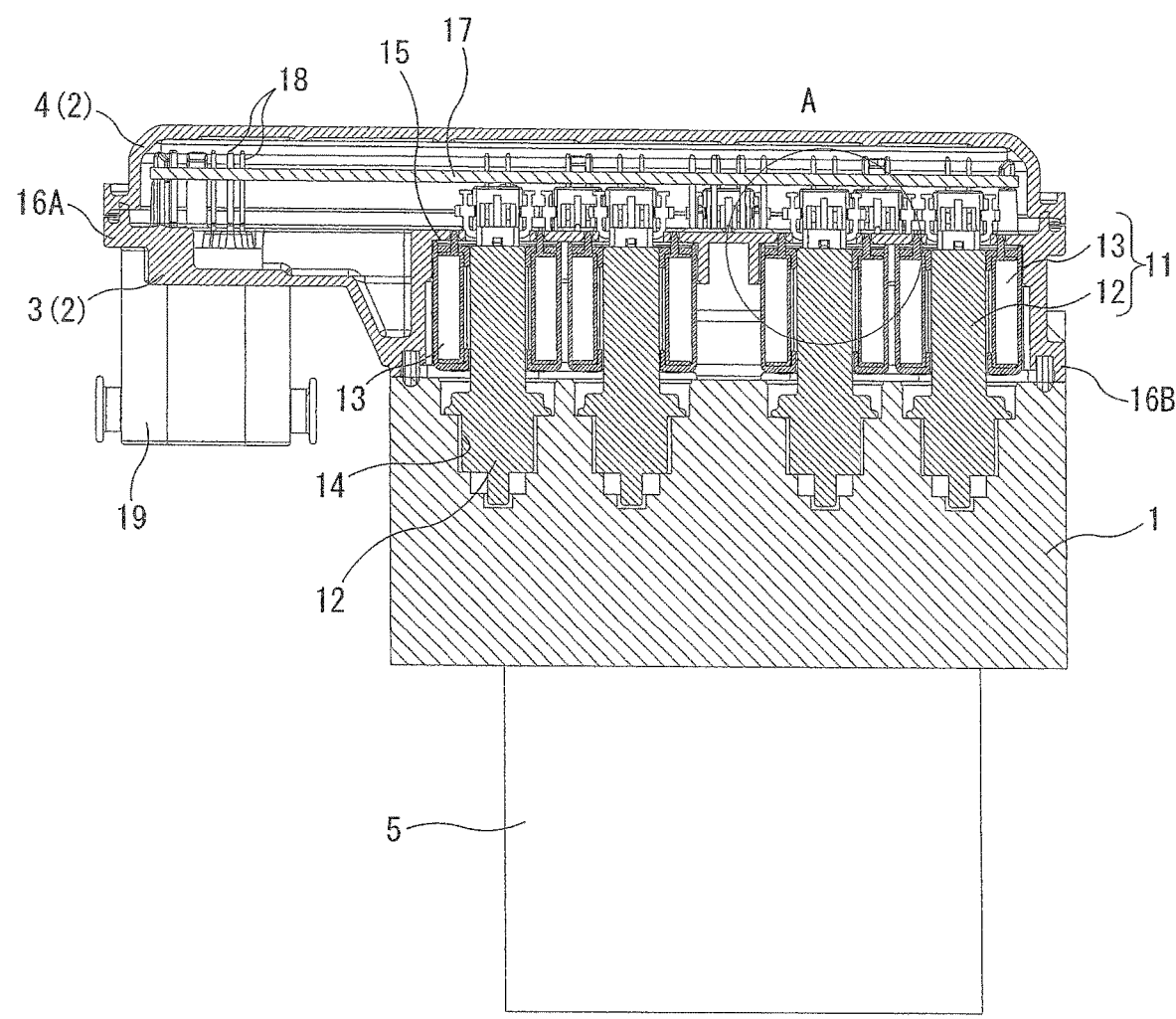
FIG. 1 is a schematic sectional view showing a brake control device according to a first embodiment of the present invention.
Figure 2:
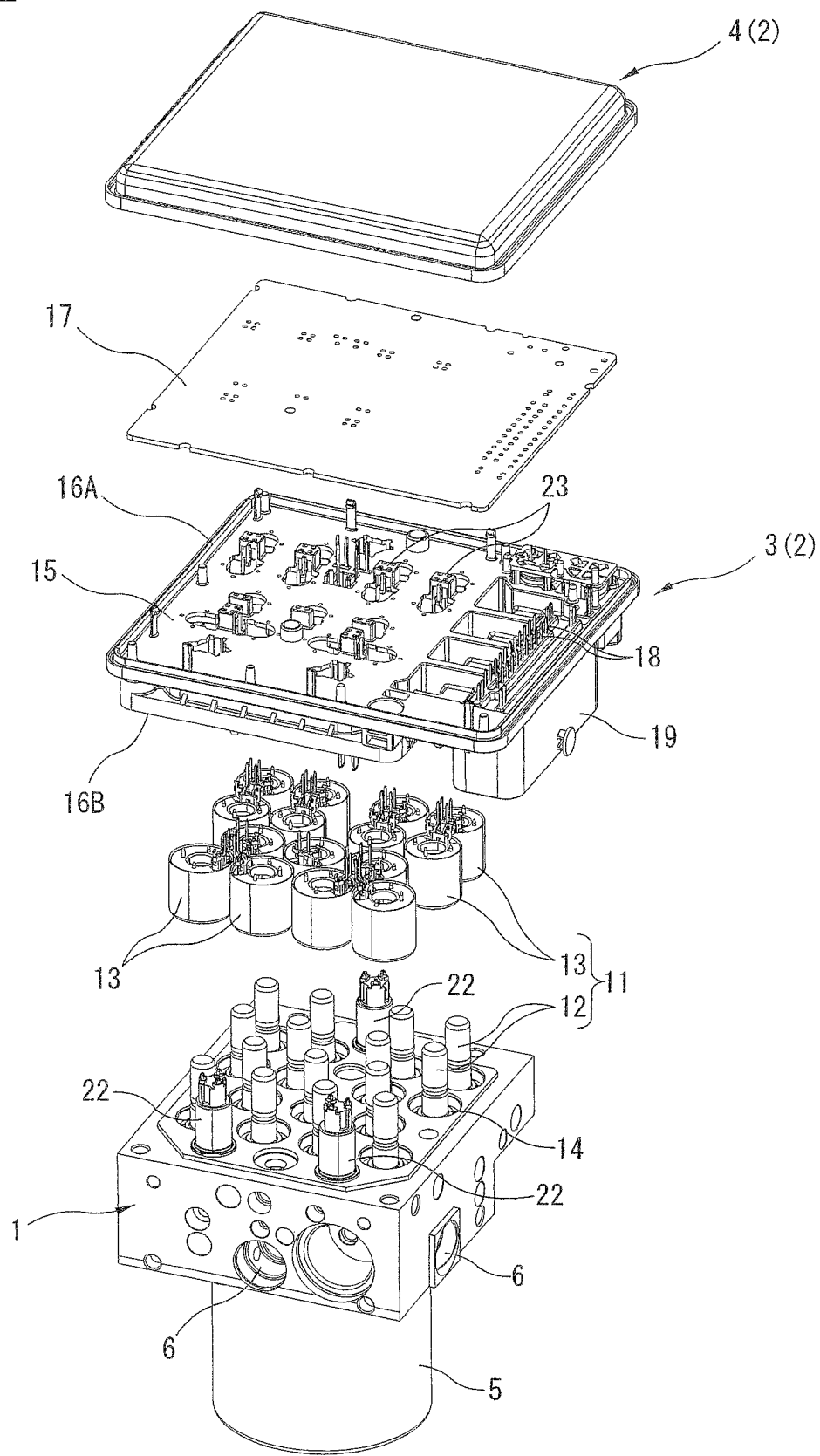
FIG. 2 is an exploded perspective view showing the brake control device.

FIG. 1 is a schematic sectional view showing a brake control device according to a first embodiment of the present invention. FIG. 2 is an exploded perspective view showing the brake control device. This brake control device is disposed between a master cylinder of a vehicle, and wheel cylinders of wheels. This brake control device is arranged to control brake hydraulic pressures supplied to the wheel cylinders of the wheels, based on wheel speeds and so on. The brake control device includes a hydraulic block 1 in which a fluid passage (not shown) that is a part of a brake pipe is formed; a case 2 which is formed from a body 3 and a cover 4 into a box shape, and which is staked on one end surface of the hydraulic block 1; and an electric motor 5 mounted on the other surface of the hydraulic block 1. The electric motor 5 is arranged to drive a plunger pump (not shown) disposed within the hydraulic block 1. A plurality of solenoid valves 11 (for example, fifteen solenoid valves) are provided in the hydraulic block 1 and the case 2. The solenoid valves 11 are arranged to increase and decrease the brake hydraulic pressures supplied to the wheels, by using the plunger pump. Each of the solenoid valves 11 includes a valve element 12 inserted into a valve insertion hole 14 of the hydraulic block 1; and a coil assembly 13 which has a substantially cylindrical shape, and which is arranged to drive this valve element 12 in an axial direction. Each of the coil assemblies 13 is disposed in the case 2, specifically, on a bottom surface of the body 3. Three pressure sensors 22 are provided around the plurality of the solenoid valves 11. Each of the pressure sensors 22 is arranged to sense a hydraulic pressure of various portions. The plurality of the solenoid valves 11 includes a normally-closed solenoid valve and a normally-open solenoid valve. However, in this case, these are not specifically differentiated.

The hydraulic block 1 is formed from metal such as an aluminum alloy into a block shape. The hydraulic block 1 includes the above-described fluid passage formed within the hydraulic block 1 into a predetermined circuit shape. A plurality of hydraulic ports 6 are disposed on side surfaces of the hydraulic block 1. Hydraulic pipes which are connected to the wheel cylinders and so on are connected to the plurality of the hydraulic ports 6.

The body 3 is molded by using, for example, hard synthetic resin. The body 3 includes a bottom wall 15 which is recessed with respect to a block side flange portion 16B that is a mounting surface with the hydraulic block 1; and a cover side flange portion 16A which is formed to a periphery of the body 3, and to which the cover 4 is mounted. A connector 19 including a plurality of terminals 18 are disposed on one side portion of the body 3 which protrudes in a lateral direction from the hydraulic block 1. The cover 4 is, for example, a press-formed member of metal plate, or a die casting of aluminum alloy. The cover 4 is mounted to the cover side flange portion 16A to cover an entire opening surface of the body 3.

The bottom wall 15 of the body 3 is apart from a surface of the hydraulic block 1. The coil assemblies 13 are disposed between the bottom wall 15 of the body 3, and the hydraulic block 1. That is, the plurality of the coil assemblies 13 are received within a space formed radially inside the block side flange portion 16B of the body 3 which is abutted on the hydraulic block 1. Moreover, a circuit board (circuit substrate) 17 is received within the case 2 constituted by the body 3 and the cover 4. The circuit board 17 includes an electric circuit configured to drive the solenoid valves 11. This circuit board 17 is disposed substantially parallel to the bottom wall 15 of the body 3. A predetermined clearance is provided between the circuit board 17 and the bottom wall 15. Many electric components (not shown) are mounted on the circuit board 17. The plurality of the terminals 18 extending from the connector 19 are connected to the circuit board 17.

Figure 3:
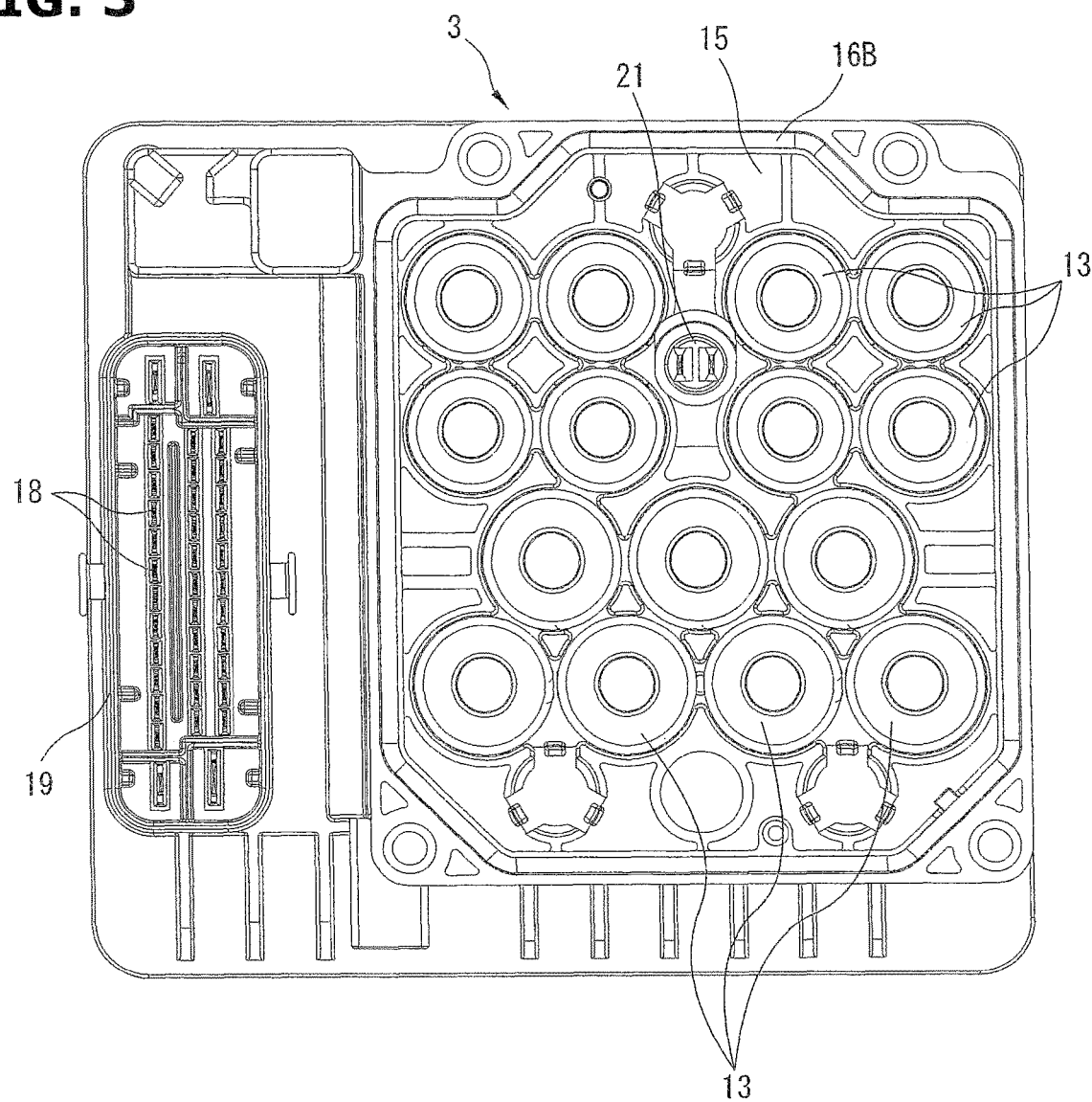
FIG. 3 is a bottom view showing a configuration of a bottom surface side of a body.
Figure 4:
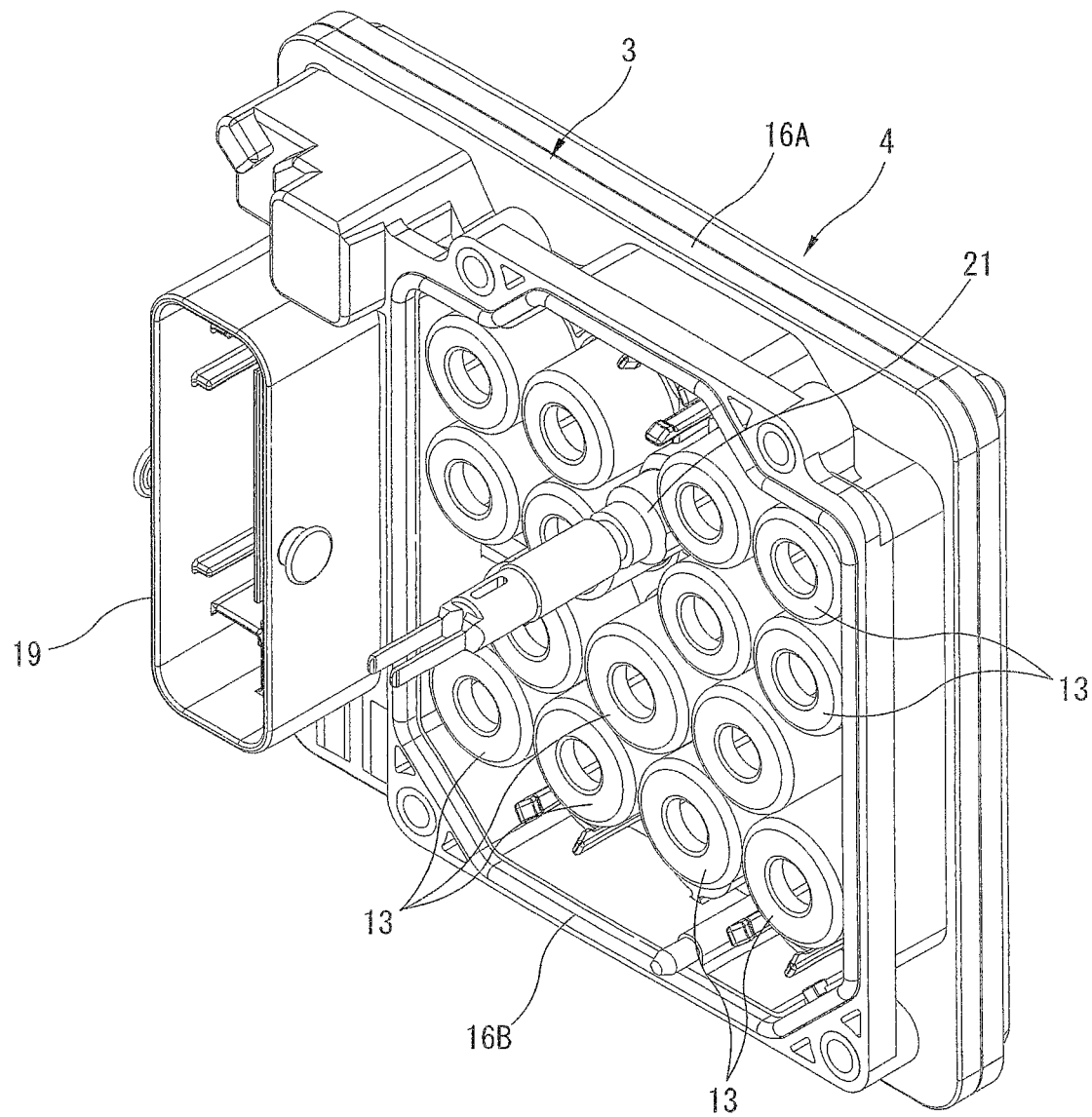
FIG. 4 is a perspective view showing the configuration of the bottom surface side of the body.

FIG. 3 and FIG. 4 are a bottom view and a perspective view which show a configuration of a bottom surface side of the body 3. As shown in the drawings, the block side flange portion 16B jointed to the hydraulic block 1 has a substantially rectangular continuous shape. The connecter 19 is positioned outside the block side flange portion 16B. The plurality of the coil assemblies 13 (for example, fifteen coil assemblies) are densely disposed in a region surrounded by the block side flange portion 16B. In particular, four coil assemblies 13 of one group are disposed, respectively, at apexes of a rectangular shape to be adjacent to one another. Another group of four coil assemblies 13 is disposed adjacent to the one group of the four coil assemblies 13. The four coil assemblies 13 of the another group are similarly disposed, respectively, at apexes of a rectangular shape to be adjacent to one another. A motor post 21 is disposed between these two groups. The motor post 21 protrudes in a cylindrical shape to be electrically connected to the electric motor 5. Moreover, seven coil assemblies 13 are disposed in a residual space which is adjacent to the two groups. Three coil assemblies 13 disposed in a row, and four coil assemblies 13 disposed in a row are disposed to be misaligned to each other by a half pitch (to have a half pitch deviation). As described later in detail, each of the coil assemblies 13 has a substantially cylindrical outer shape. An very small gap is provided between two coil assemblies 13 which are adjacent to each other. That is, for attaining the size reduction, the fifteen coil assemblies 13 are densely disposed to ensure the very small gap between the adjacent two coil assemblies 13.

[Configuration of Coil Assembly]

Figure 10:
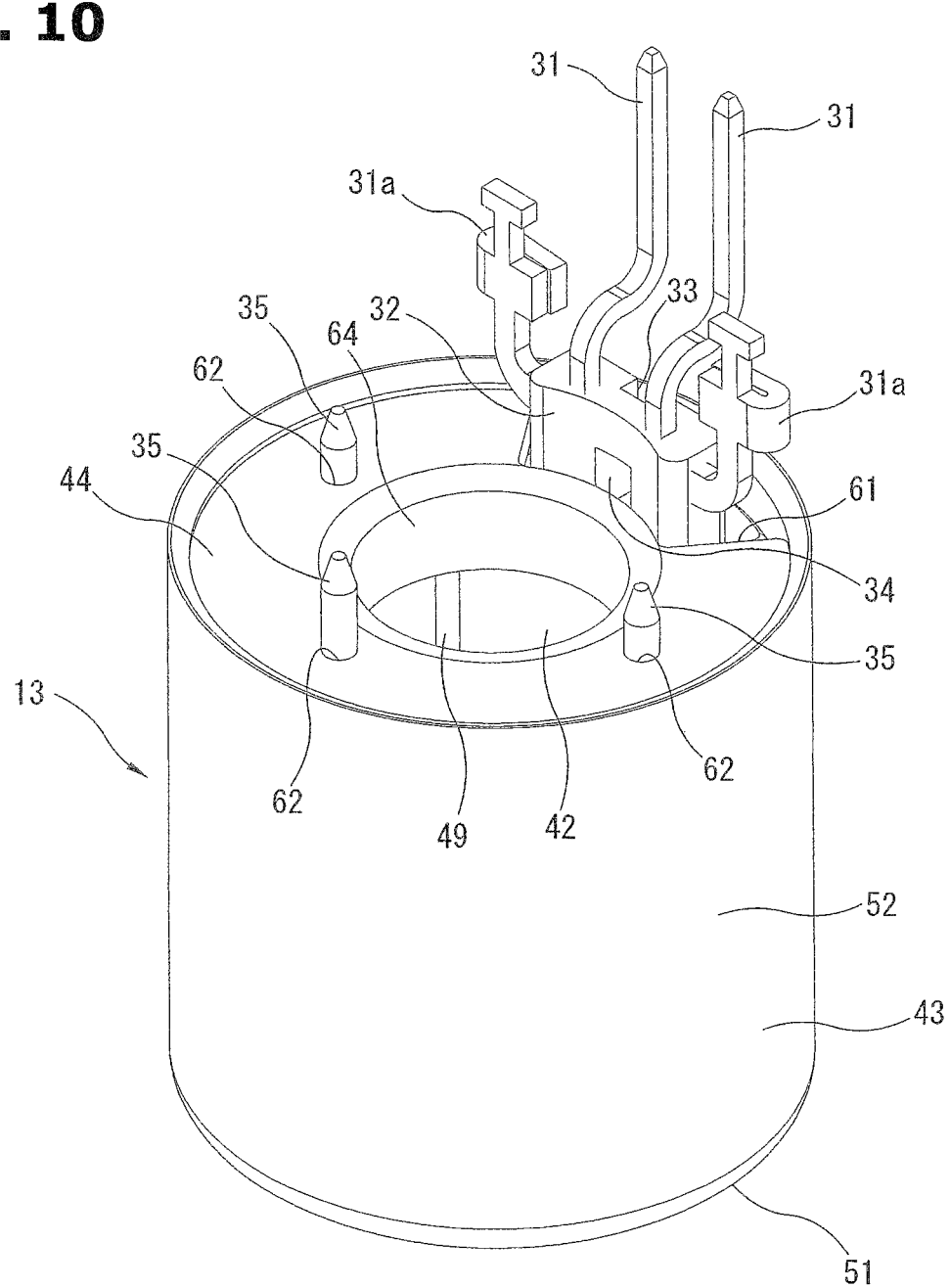
FIG. 10 is a perspective view showing the coil assembly according to the first embodiment.
Figure 11:
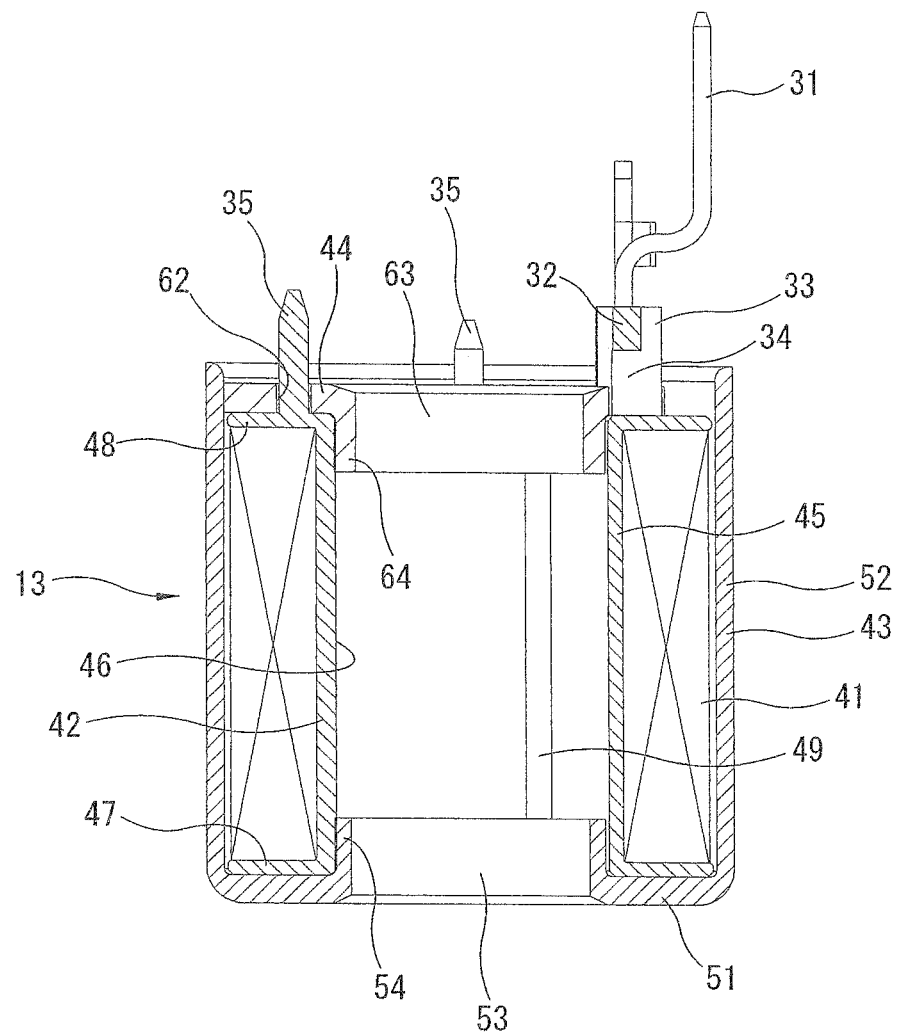
FIG. 11 is a sectional view showing the coil assembly.
Figure 12:
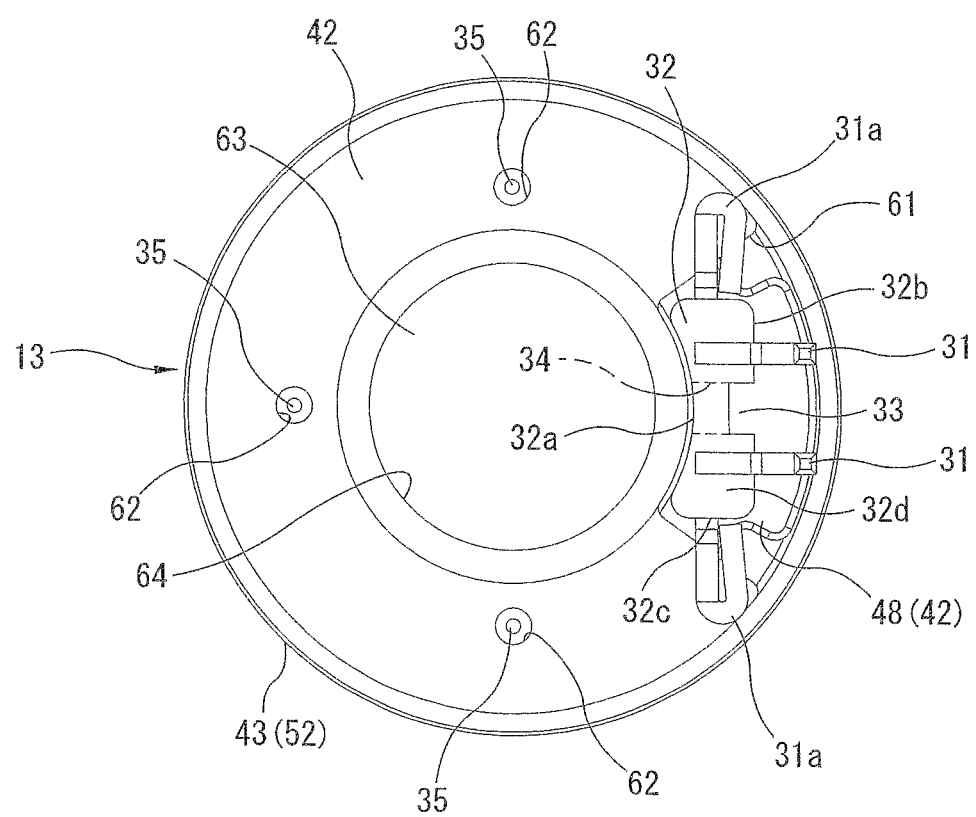
FIG. 12 is an upper view showing the coil assembly.
Figure 13:
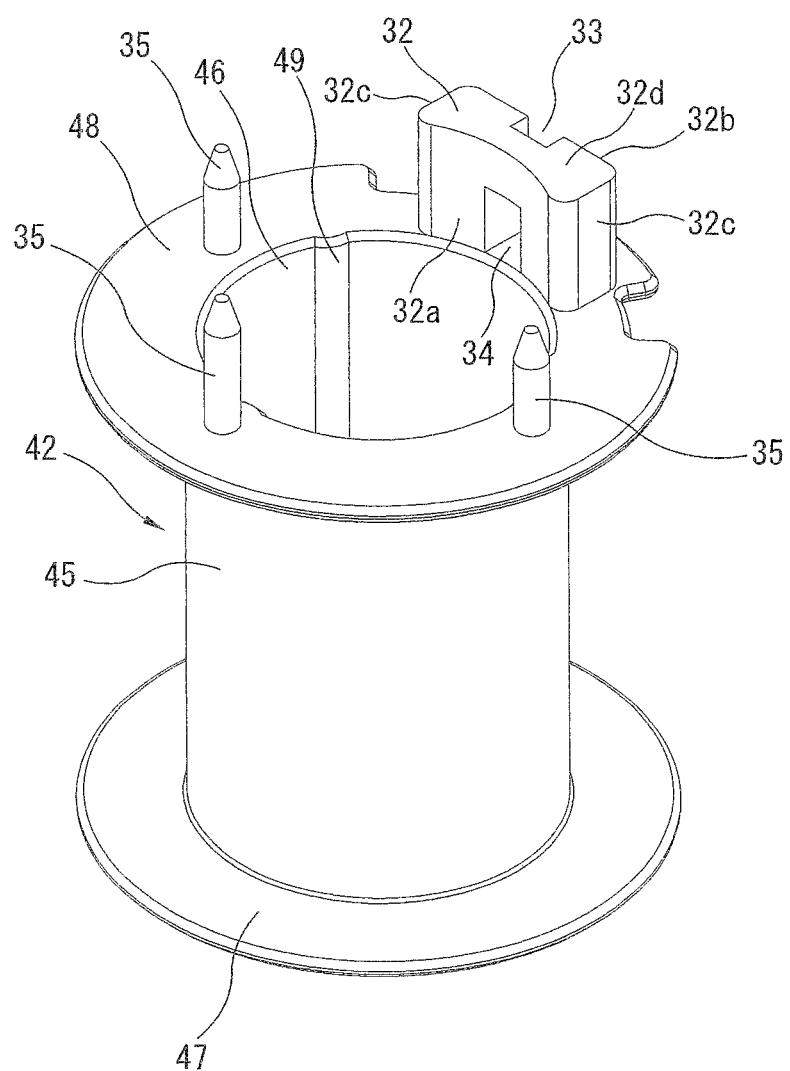
FIG. 13 is a perspective view showing only a synthetic resin portion of a coil bobbin.

One example of the configuration of the coil assembly 13 is explained with reference to FIG. 10 to FIG. 13. FIG. 10 is a perspective view of the coil assembly 13. FIG. 11 is a sectional view of the coil assembly 13. FIG. 12 is an upper view of the coil assembly 13. The coil assembly 13 includes a coil bobbin 42 around which a coil 41 is wound; a first yoke 43 which has a cylindrical shape, which includes one end opening, and which receives this coil bobbin 42; and a second yoke 44 disposed along this opening end of the first yoke 43. FIG. 13 is a perspective view showing the only synthetic resin portion of the coil bobbin 42.

The coil bobbin 42 is integrally molded from the hard synthetic resin. As shown in FIG. 13, the coil bobbin 42 includes a shaft portion 45 which has a cylindrical shape, and around which the coil 41 is wound; a shaft through hole 46 which has a circular section, and which penetrates through the shaft portion 45 in the axial direction; and a first flange 47 and a second flange 48 which are formed on both ends of the shaft portion 45, and which protrude in the radial direction. Each of the first flange 47 and the second flange 48 has an annular shape having an identical outside diameter. Besides, the shaft through hole 46 and the shaft portion 45 are formed to be coaxial with each other. Accordingly, the shaft portion 45 has a substantially cylindrical shape.

For example, three protruding portions 49 are formed on the inner circumference surface of the shaft through hole 46. Each of the protruding portions 49 protrudes in a radially inside direction to have a semicircular section or an annular section. In this embodiment, each of the protruding portions 49 is continuously formed in a linear shape in an entire length of the shaft through hole 46.

The first yoke 43 is integrally made from metal which is the magnetic substance, such as iron series material. The first yoke 43 includes an end wall portion 51 confronting the first flange 47 of the coil bobbin 42; and a side wall portion 52 having a cylindrical shape rising from a circumference edge of this end wall portion 51. The side wall portion 52 has an inside diameter slightly greater than outside diameters of the first flange 47 and the second flange 48 of the coil bobbin 42. The side wall portion 52 has an axial length slightly greater than the entire length of the coil bobbin 42. Besides, the side wall portion 52 may have a polygonal section. Moreover, the side wall portion 52 may have a slit-shaped opening portion. The end wall portion 51 includes a circular through hole 53 formed at a central portion of the end wall portion 51. A first rising wall 54 is formed at an opening edge of the through hole 53. The first rising wall 54 rises toward the inside of the first yoke 43. That is, the first rising wall 54 provided at the opening edge of the through hole 53 has a relatively short cylindrical shape extending from the end wall portion 51 in parallel to the side wall portion 52. The thus-constructed cylindrical first rising wall 54 is jointed, by the press fit, on the inner circumference side of the shaft through hole 46 of the coil bobbin 42 which has the three protruding portions 49.

The second yoke 44 is integrally made from the metal which is the magnetic substance, such as the iron series material, similarly to the first yoke 43. The second yoke 44 has a circular plate shape having a diameter substantially identical to the outside diameter of the second flange 48 of the coil bobbin 42 (that is, a diameter slightly smaller than the inside diameter of the side wall portion 52 of the first yoke 43). The second yoke 44 is disposed to be overlapped with the second flange 48 of the coil bobbin 42.

The circular second yoke 44 includes a through hole 63 which has a circular shape, and which is formed at a central portion of the second yoke 44. A second rising wall 64 is formed at an opening edge of this through hole 63. The second rising wall 64 rises toward the inside of the first yoke 43. That is, the second rising wall 64 provided at the opening edge of the through hole 63 has a relatively short cylindrical shape extending perpendicularly to the surface of the second yoke 44. Similarly to the above-described first rising wall 54, the thus-constructed cylindrical second rising wall 64 is jointed, by the press fit, on the inner circumference side of the shaft through hole 46 of the coil bobbin 42 which has the three protruding portions 49.

Accordingly, in a state where the coil bobbin 42, the first yoke 43, and the second yoke 44 are assembled as shown in FIG. 11, the first yoke 43 is connected to the coil bobbin 42 at one end portion of the coil bobbin 42 in the axial direction. Moreover, the second yoke 44 is connected to the coil bobbin 42 at the other end portion of the coil bobbin 42 in the axial direction. The second yoke 44 is positioned to be overlapped with the second flange 48 of the coil bobbin 42. The second yoke 44 is disposed radially inside the side wall portion 52. With this, the opening end of the first yoke 43 is substantially covered by the second yoke 44. The first yoke 43 and the second yoke 44 constitute a continuous magnetic path. Basically, the first yoke 43 and the second yoke 44 are not engaged with each other. That is, the first yoke 43 and the second yoke 44 are integrally assembled through the coil bobbin 42 made from the synthetic resin.

The coil bobbin 42 includes a terminal support base portion 32 which is integrally molded as a part of the coil bobbin 42, which is formed on an outer surface of the second flange 48 in the axial direction, and which protrudes from the end surface in the axial direction of the coil bobbin 42. The coil assembly 13 includes a pair of terminals 31 extending in the axial direction of the coil bobbin 42. These terminals 31 are molded in the terminal support base portion 32. A base end portion of each of the terminals 31 is a wiring connection portion 31a which laterally protrudes from the terminal support base portion 32, and to which a wire end portion of the coil 41 is connected. Each of the terminals 31 extends from a base (joint) portion held by the terminal support base portion 32. The terminal 31 is bent in the radially outward direction of the coil bobbin 42. Moreover, the terminal 31 extends in the axial direction of the coil bobbin 42.

[Concrete Configurations of First Engagement Portion and Second Engagement Portion]

The above-described terminal support base portion 32 provided to the second flange 48 of the coil bobbin 42 corresponds to a "wall portion" in claims. As shown in FIG. 10 to FIG. 13, the terminal support base portion 32 is formed to protrude from the end surface of the annular second flange 48 in the wall shape curved in the arc shape along the opening edge of the shaft through hole 46. Specifically, the terminal support base portion 32 includes an inside surface 32a directing in the radially inside direction of the coil bobbin 42; an outside surface 32b directing in the radially outside direction of the coil bobbin 42; a pair of side surfaces 32c directing in a tangent direction of the coil bobbin 42; and a top surface 32d directing in the axial direction of the coil bobbin 42. The terminals 31 protrude from the top surface 32d. The wiring connection portions 31a protrude, respectively, from the side surfaces 32c. A recessed groove 33 is formed on the outside surface 32b between the pair of the terminals 31. The recessed groove 33 has a rectangular section. The recessed groove 33 extends linearly in the axial direction of the coil bobbin 42. Moreover, a rectangular opening portion 34 is provided at an end position of the recessed groove 33. The opening portion 34 penetrates through the terminal support base portion 32 in the radial direction of the coil bobbin 42. This opening portion 34 corresponds to a "first engagement portion" in the claims. That is, the opening portion 34 and the recessed groove 33 have an identical opening width. The opening portion 34 and the recessed groove 33 are continuous in the axial direction of the coil bobbin 42. As shown in FIG. 11, the opening portion 34 has a size to reach the end surface of the second flange 48. On the inside surface 32a of the terminal support base portion 32, a part of the opening surface of the opening portion 34 is covered by the second yoke 44. Besides, the opening portion 34 may be a recessed portion which does not reach the inside surface 32a.

As is clear from FIG. 2, the terminal support base portion 32 is positioned inside a projection surface obtained by projecting an outer shape (profile) of the first yoke 43 (that is, the outer circumference surface of the side wall portion 52) in the axial direction of the coil bobbin 42. That is, the terminal support base portion 32 protrudes in the axial direction of the coil bobbin 42 in a range inside the outer circumference surface of the first yoke 43 defining the outer shape size of the main part of the coil assembly 13.

Figure 5:
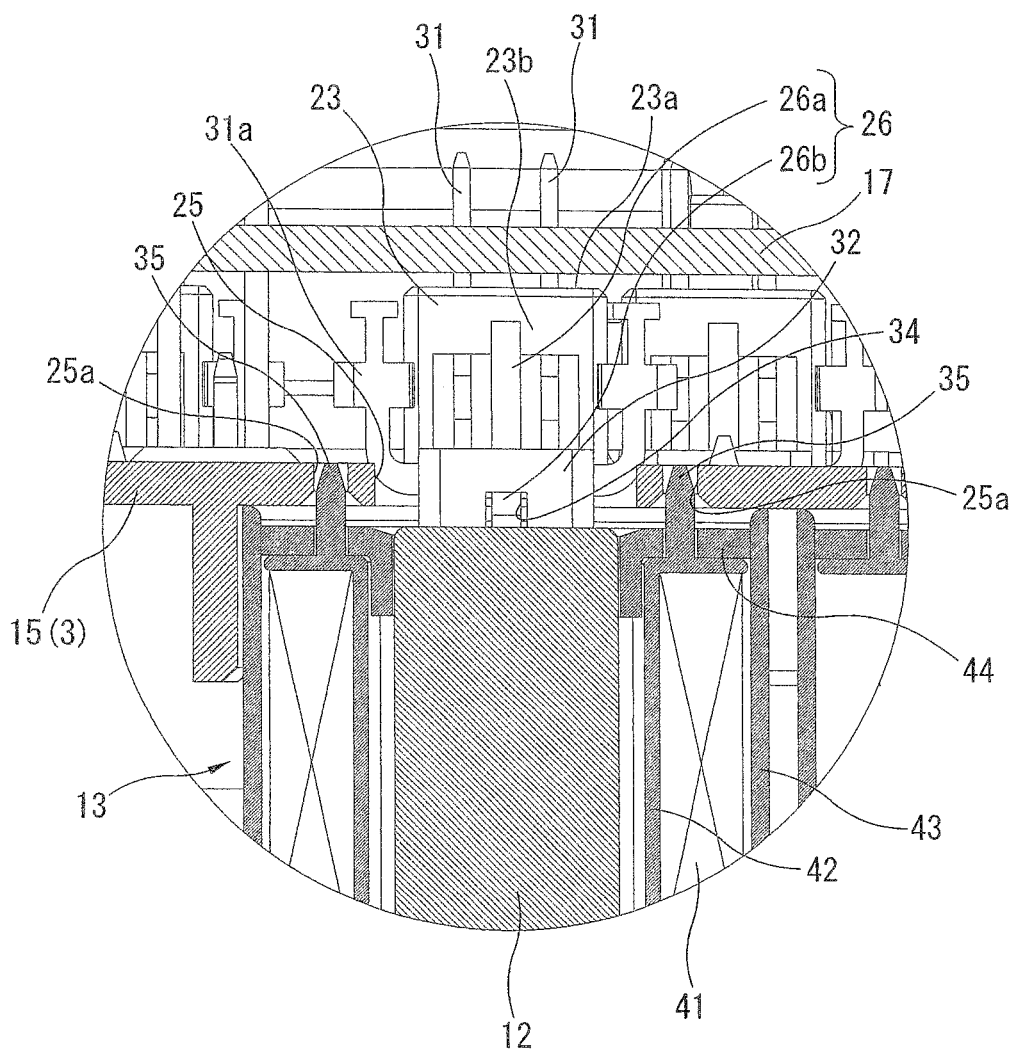
FIG. 5 is an enlarged sectional view showing an A portion in FIG. 1.

FIG. 5 is an enlarged sectional view showing A portion in FIG. 1 when the coil assemblies 13 are assembled to the body 3 (the case 2). As shown in FIG. 5, the pair of the terminals 31 of each coil assembly 13 penetrate through through holes of the circuit board 17, and are soldered to the circuit board 17. By this soldering of the terminals 31, each coil assembly 13 is finally supported and fixed on the bottom surface of the body 3 (the bottom wall 15).

Figure 6:
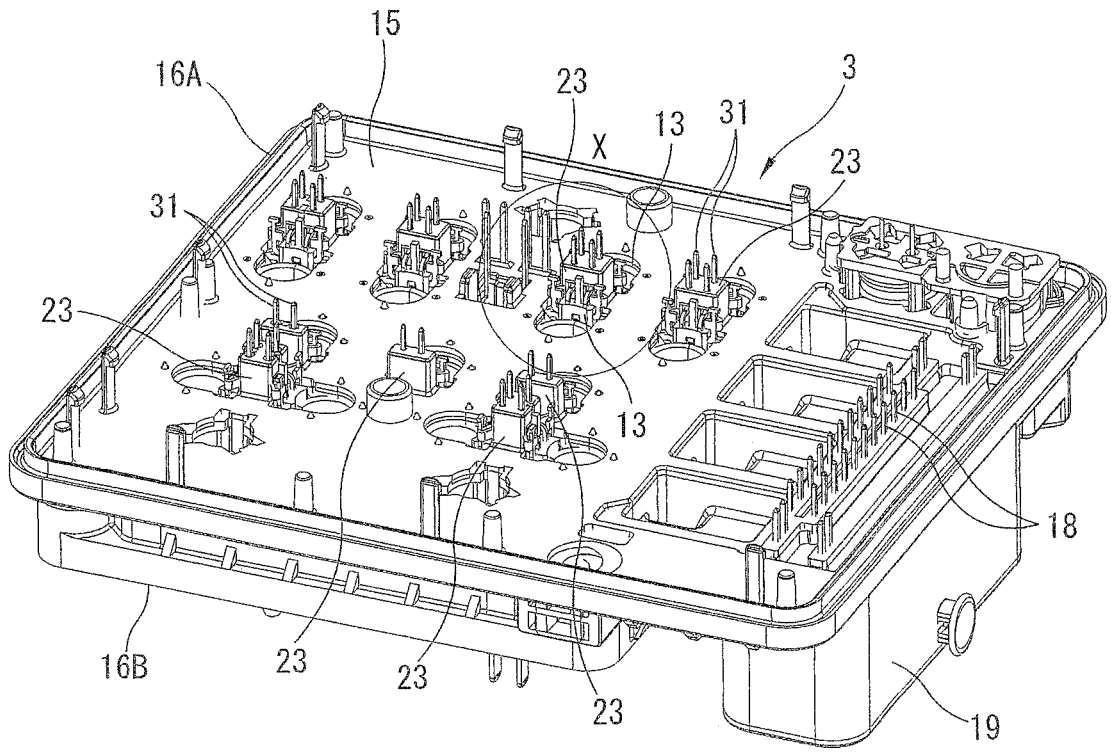
FIG. 6 is a perspective view showing a configuration of an upper surface side of the body in a state where a circuit board is detached.
Figure 7:
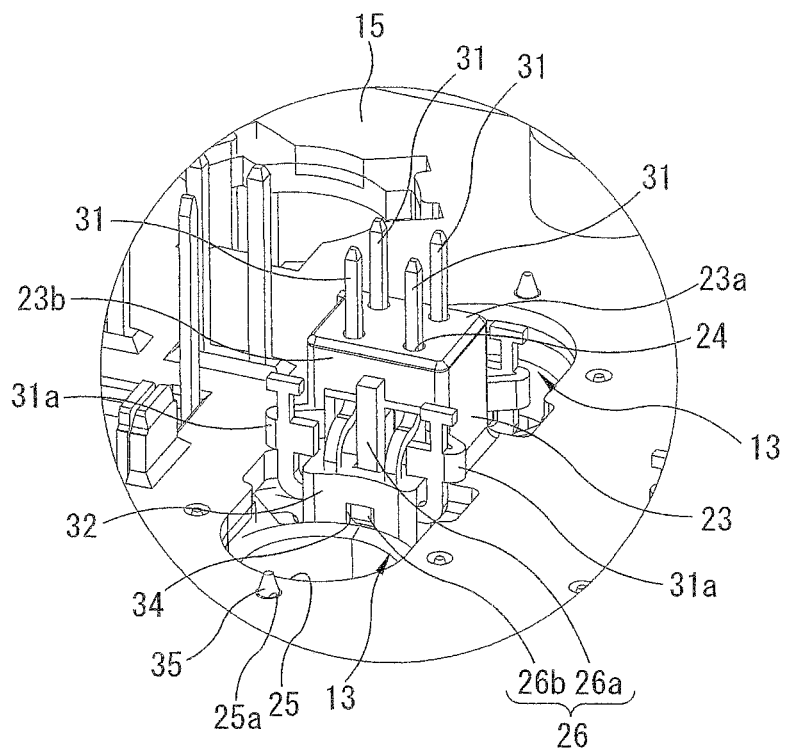
FIG. 7 is an enlarged view showing an X portion in FIG. 6.
Figure 8:
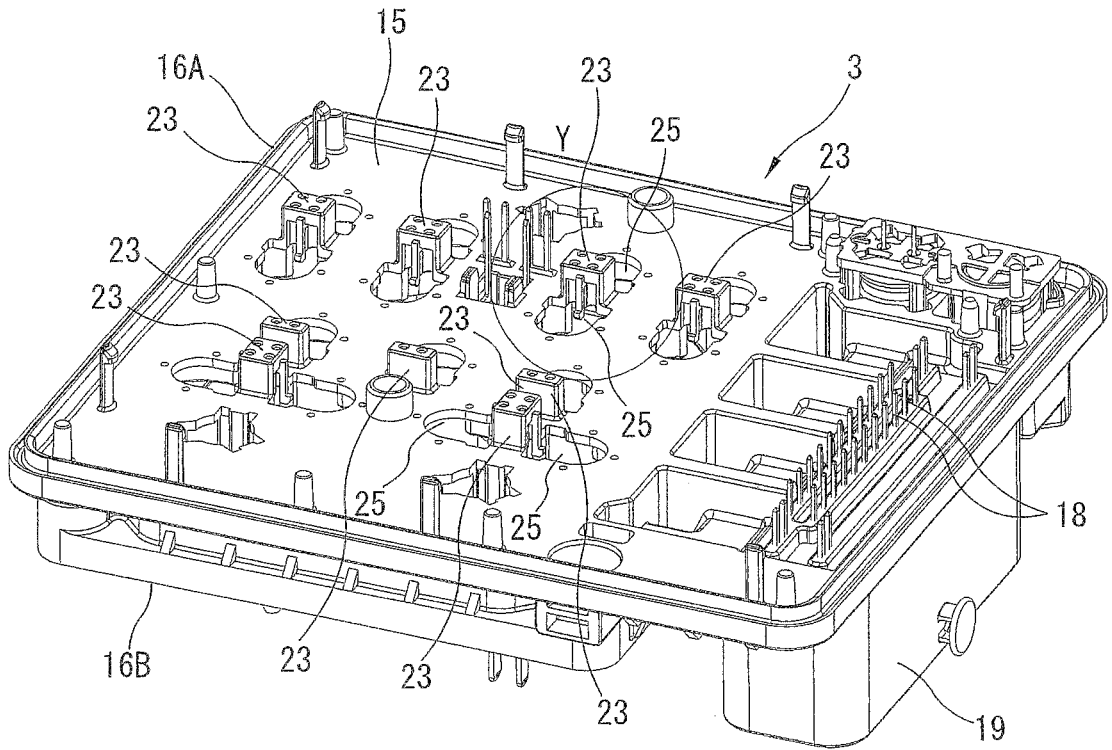
FIG. 8 is a perspective view showing the configuration of the upper surface side of the body before coil assemblies are attached.
Figure 9:
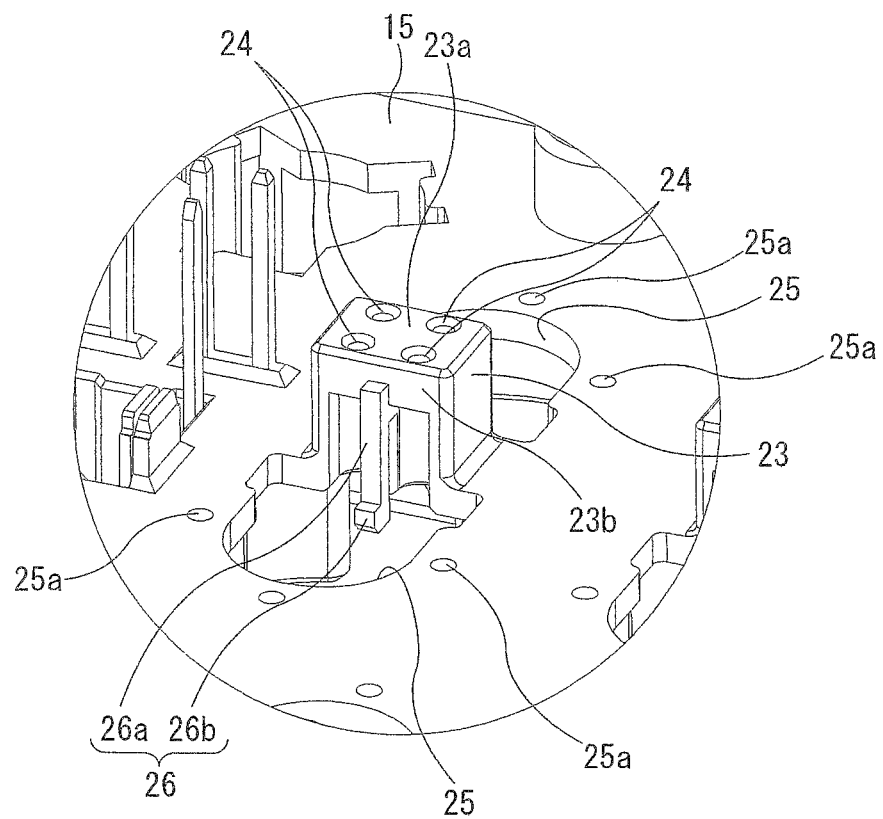
FIG. 9 is an enlarged view showing a Y portion in FIG. 8.

FIG. 6 is a perspective view showing a configuration of an upper surface side of the body 3 when the circuit board 17 is detached. FIG. 7 is an enlarged perspective view showing a part (X portion) of FIG. 6. FIG. 8 is a perspective view showing a configuration of the upper surface side of the body 3 before the coil assemblies 3 are mounted. FIG. 9 is an enlarged perspective view showing a part (Y portion) of FIG. 8. As shown in these drawings, terminal guides 23 are formed on the bottom wall 15 of the body 3 at positions corresponding to the positions of the coil assemblies 13. Each of the terminal guides 23 is raised in a rectangular column shape. Each of the terminal guides 23 includes terminal guide hole 24 each of which is formed on a top surface 23a of the each terminal guide 23, each of which penetrates through the top surface 23a, and each of which corresponds to one of the terminals 31. The terminals 31 of the coil assembly 13 penetrate through the terminal guide holes 24, and extend in the upward direction. The top surface 23a of each of the terminal guides 23 is positioned near the circuit board 17 through a small clearance. Accordingly, each of the terminals 31 is restricted at a predetermined position near the circuit board 17 by the insertion of the each terminal 31 into the terminal guide hole 24. Consequently, it is ease to insert the terminals 31 to the through holes of the circuit board 17.

In this case, in the residual twelve coil assemblies other than the three coil assemblies 13 disposed in the row, a pair of the two adjacent coil assemblies 13 is disposed back to back in the body 3. That is, the pair of the two coil assemblies 13 are disposed so that the respective terminal support base portions 32 are adjacent to each other. One of the terminal guides 23 having the square (quadrate) top surface 23*a* is provided between the pair of the two coil assemblies 13, as shown in FIG. 7 and FIG. 9. The four terminal guide holes 24 are formed on this top surface 23*a* of the one terminal guide 23. That is, the four terminals 31 of the pair of the two coil assemblies 13 are held by the one terminal guide 23. As shown in FIG. 9, opening portions 25 are formed in the bottom wall 15 on both sides of the terminal guide 23 so as to avoid the interference with the terminal support base portion 32, the wiring connection portion 31*a*, and so on. Each of the opening portions 25 have a shape obtained by dividing an ellipse into two. Moreover, three positioning holes 25*a* are formed around each of the opening portions 25. The positioning holes 25*a* penetrate through the bottom wall 15.

Each of the terminal guides 23 includes a coil support hook 26 which is a "second engagement portion", which is formed on a side surface 23*b* confronting the coil assembly 13, and which is arranged to be engaged with the opening portion 34 of the terminal support base portion 32 which is the "first engagement portion". Each of the coil support hooks 26 is integrally molded with the terminal guide 23. Each of the coil hooks 26 includes an arm portion 26*a* extending linearly from a portion near the top surface 23*a* in the downward direction (toward the side of the back surface of the bottom wall 15) at a middle portion of the opened side surface 23*b*; and a claw portion 26*b* provided at a tip end of this arm portion 26*a*.

The arm portion 26*a* has a rod shape having a rectangular section. The arm portion 26*a* has a width corresponding to the recessed groove 33 of the terminal support base portion 22. The arm portion 26*a* is molded to protrude outwardly from the surface of the side surface 23*b* of the terminal guide 23. The claw portion 26*b* is formed at the tip end portion of the arm portion 26*a* to protrude in a wedge shape in a direction perpendicular to the side surface 23*b*. This claw portion 26*b* has a size corresponding to the opening portion 34 which is the "first engagement portion" of the terminal support base portion 32. The arm portion 26*a* has sizes such as a length, which is set to be deformed to be elastically curved in the direction perpendicular to the side surface 23*b* of the terminal guide 23 (that is, in the protruding direction of the claw portion 26*b*), so as to attain the elastic engagement of the claw portion 26*b*.

As shown in FIG. 9, the coil support hook 26 extends into the inside of the opening portion 25 of the bottom wall 15. The claw portion 26*b* at the tip end of the coil support hook 26 is positioned below the upper surface (the surface on the side of the circuit board 17) of the bottom wall 15 (on the side of the coil assembly 13).

In the above-described configuration, when the coil assembly 13 is inserted from the back surface side of the bottom wall 15 at the assembling operation of the device, the claw portion 26*b* of the coil support hook 26 is guided along the recessed groove 33. In this case, the arm portion 26*a* is pressed by the recessed groove 33 so as to be elastically deformed to be curved. Then, when the claw portion 26*b* is aligned with the opening portion 34 of the coil assembly 13, the claw portion 26*b* is spontaneously engaged with the opening portion 34 (cf. FIG. 5 and FIG. 7) by the elastic restoring force of the arm portion 26*a*. Moreover, at the same time, three pins 35 of the coil assembly 13 are mounted, respectively, in the positioning holes 25*a* of the bottom wall 15 (cf. FIG. 5). By this mounting between the pins 35 and the positioning hole 25*a*, the position of the coil assembly 13 with respect to the body 3 is ensured at a predetermined position, so that the rotation of the coil assembly 13 having the cylindrical shape is restricted.

By the above-described engagement of the coil support hook 26 with the opening portion 34 of the terminal support base portion 32, the coil assembly 13 is temporarily fixed to the body 3 before the soldering of the terminal 31 to the circuit board 17. Accordingly, it is possible to prevent the coil assembly 13 from dropping off from the body 3 before the soldering to the circuit board 17. Moreover, even after the soldering, a part of the load acted to the coil assembly 13 due to the vibration and so on is supported by the engagement between the coil support hook 26 and the opening portion 34, so that the stress at the soldering portion is relieved.

As described above, the terminal guide 23 which has the substantially square shape for the pair of the two coil assemblies 13 includes the coil support hooks 26 provided on the two side surfaces 23*b* which are directed in the opposite directions. With this, the two coil assemblies 13 paired back-to-back are held by the one terminal guide 23.

Besides, as shown in FIG. 8, each of the terminal guides 23 for the three coil assemblies 13 arranged in the row includes the rectangular top surface 23*a* having the two terminal guide holes 24 corresponding to one of the coil assemblies 13, so that the each of the terminal guide 23 has a relatively small size. The each of the terminal guides 23 also has the coil support hook 26. Moreover, each of the positioning holes 25*a* provided around the opening portion 25 of the bottom wall 15 has the identical configuration. Accordingly, the corresponding coil assembly 13 is similarly held by the engagement between the opening portion 34 which is the "first engagement portion", and the coil support hook 26 which is the "second engagement portion". Moreover, the coil assembly 13 is positioned by the mounting between the pins 35 and the positioning holes 25*a*.

In a mounting process of the coil assembly 13 to the body 3, for example, the coil assembly 13 is pushed into the predetermined position while the terminals 31 of the coil assembly 13 are inserted from the bottom surface side of the bottom wall 15 into the terminal guide holes 24 of the terminal guide 23 before the circuit board 17 is mounted to the body 3. With this, the above-described coil support hook 26 of the terminal guide 23 is engaged with the opening portion 34 of the coil assembly 13, so that the coil assembly 13 is temporarily held. At this time, the three pins of the end surface of the coil assembly 13 are inserted, respectively, into the positioning holes 25*a* of the bottom wall 15, so that the mounting position of the coil assembly 13 is surely defined (determined). Next, the circuit board 17 is disposed at the predetermined position of the body 3. The terminals 31 protruding from the through holes of the circuit board 17 are soldered. With this, the plurality of the coil assemblies 13 are fixed and supported by the circuit board 17 and the body 3.

In the above-described embodiment, it is possible to attain following operations and effects.

In this configuration, the terminal support base portion 32 provided with the opening portion 34 which is the "first engagement portion" protrudes in the axial direction of the coil bobbin 42 within the projection surface obtained by extending the outer shape (profile) of the first yoke 43 in the axial direction of the coil bobbin 42. Moreover, the claw portion 26*b* at the tip end of the coil support hook 26 extending from the body 3 in the axial direction of the coil bobbin 42 is engaged with the opening portion 34. Accordingly, an engagement holding mechanism including the terminal support base portion 32 (the opening portion 34) and the coil support hook 26 is disposed in series with a main part (that is, the cylindrical portion constituted by the coil bobbin 42, the first yoke 43 and the second yoke 44) of the coil assembly 13 along the axial direction of the coil bobbin 42. Consequently, when the plurality of the coil assemblies 13 are densely disposed on the bottom surface side of the body 3, a space substantially occupied by the each coil assembly 13 is not increased by the engagement holding mechanism. That is, the engagement holding mechanism is not disposed between the first yoke 43 of the one coil assembly 13, and the first yoke 43 of the another coil assembly 13 adjacent to the one coil assembly 13. Therefore, it is possible to minimize the clearance between the first yoke 43 of the one coil assembly 13, and the first yoke 43 of the another coil assembly 13 adjacent to the one coil assembly 13. With this, it is possible to decrease the size of the body 3 receiving the plurality of the coil assemblies 13.

In particular, in the embodiment, the wiring connection portions 31a and the terminals 31 bent in the radially outside direction of the coil bobbin 42 are within the projection surface of the first yoke 43, as shown in FIG. 12. The coil support hook 26 positioned closer to the center of the coil assembly 13 than the terminal guide holes 24 of the terminal guide 23 (cf. FIG. 9) is positioned within the projection surface of the first yoke 43.
Accordingly, the outer size of the entire coil assembly 13 is defined (determined) by the outer circumference surface of the first yoke 43. Consequently, it is possible to minimize the distance between the coil assemblies 13 which are adjacent to each other.

Moreover, in the above-described embodiment, the "wall portion" in which the "first engagement portion" is formed serves as the terminal support base portion 32, and also serves as the protruding portion supporting the terminals 31. Accordingly, it is possible to simplify the configuration on the second flange 48 of the coil bobbin 42. Furthermore, the terminals 31 are adjacent to the opening portion 34. Therefore, it is possible to integrally provide the coil support hook 26 and the terminal guide 23 which correspond to the opening portion 34.

Furthermore, in the terminal support base portion 32, the opening portion 34 which is the "first engagement portion" is disposed between the pair of the terminals 31. In the assembled state, the coil support hook 26 which is the "second engagement portion" is positioned between the pair of the terminals 31. Accordingly, the opening portion 34 and the coil support hook 26 are disposed in a needless space generated between the pair of the terminals 31, that is, by using a dead space. With this, it is possible to suppress the increase of the size of the coil assembly 13 due to the addition of the engagement holding mechanism. In the assembled state, the coil support hook 26 is disposed between the pair of the terminals 31, so that the space between the pair of the terminals 31 becomes the electrically insulating area. Consequently, it is possible to suppress the short-circuit between the terminals 31 due to the metal powder and so on.

Moreover, the terminal support base portion 32 includes the recessed groove 33 continuous with the opening portion 34. Accordingly, the claw portion 26b is guided to the opening portion 34. It is possible to improve the workability when the coil assembly 13 is inserted into the body 3. Furthermore, the arm portion 26a of the coil support hook 26 is mounted in the recessed groove 33. With this, it is possible to obtain the stable engagement state. Moreover, the arm portion 26a of the coil support hook 26 is inserted into the recessed groove 33. With this, it is possible to form the terminal guide 23 having the coil support hook 26 at a position closer to the center of the coil assembly 13.

Furthermore, the coil support hook 26 is integrally molded with the terminal guide 23. Accordingly, it is possible to ease the layout of the various portions on the bottom wall 15 of the body 3. This is advantageous for the size reduction of the body 3. In particular, in the some coil assemblies 13, the pair of coil assemblies 13 are collected and disposed in the one terminal guide 23. With this, it is possible to attain the size reduction of the body 3. The terminal guide 23 is molded to be raised from the bottom wall 15. The coil support hook 26 is provided on the side surface 23b of the terminal guide 23. Accordingly, it is possible to readily ensure the length of the arm portion 26a which is necessary for the curve deformation.

Moreover, the four terminals 31 of the pair of the coil assemblies 13 are disposed to be adjacent to one another by the one terminal guide 23. Accordingly, this is advantageous for ensuring the mounting area on the circuit board 17 for the electric components. The terminals 31 of each of the coil assemblies 13 are bent in the radially outward direction. With this, the terminals 31 of the pair of the coil assemblies 13 are disposed closer to each other.

Furthermore, in this embodiment, there are provided the pins 35 and the positioning holes 25a which are arranged to position the coil assembly 13, in addition to the opening portion 34 and the coil support hook 26 which are arranged to be engaged with each other to hold the coil assembly 13. Accordingly, it is possible to restrict the rotation of the coil assembly 13, and to suppress the deformation of the terminals 31.

[First Engagement Portion and Second Engagement Portion in Second Embodiment]

Next, a second embodiment according to the present invention is explained with reference to FIG. 14 to FIG. 19. Hereinafter, configurations different from those in the first embodiment are mainly explained.

Figure 14:
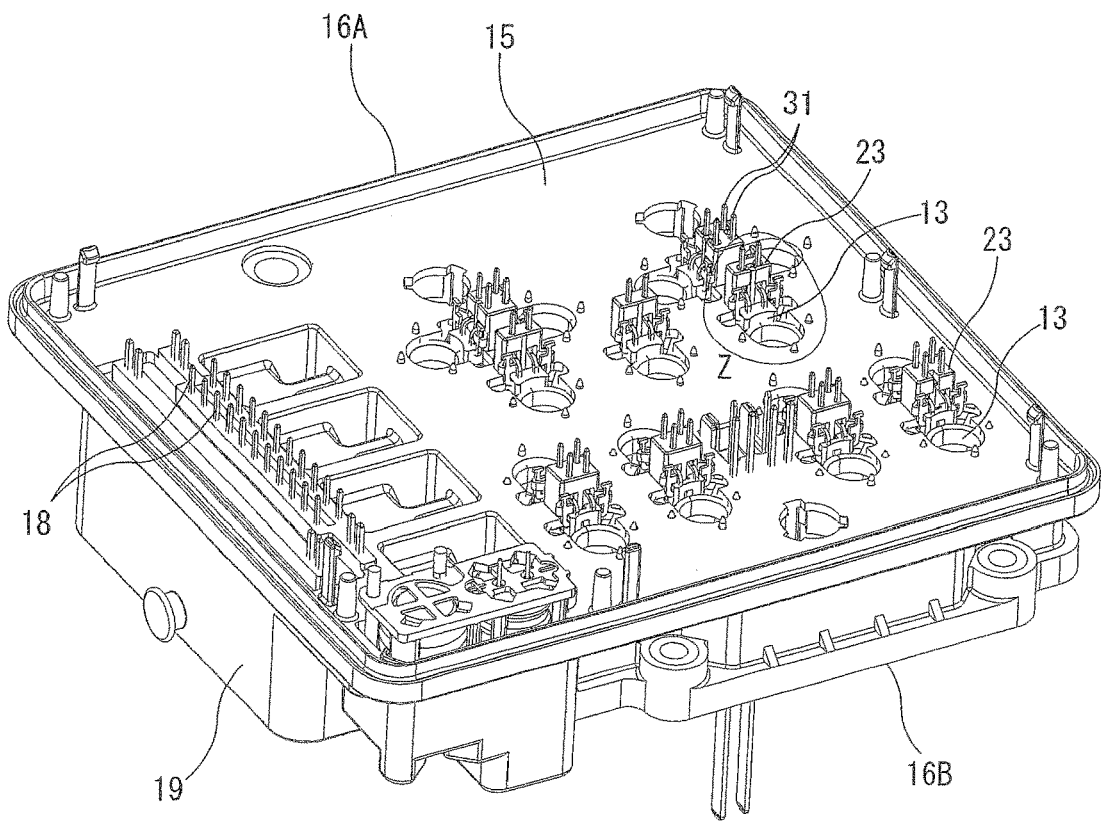
FIG. 14 is a perspective view showing a configuration of an upper surface side of a body in a state where a circuit board is detached, in a second embodiment.
Figure 15:
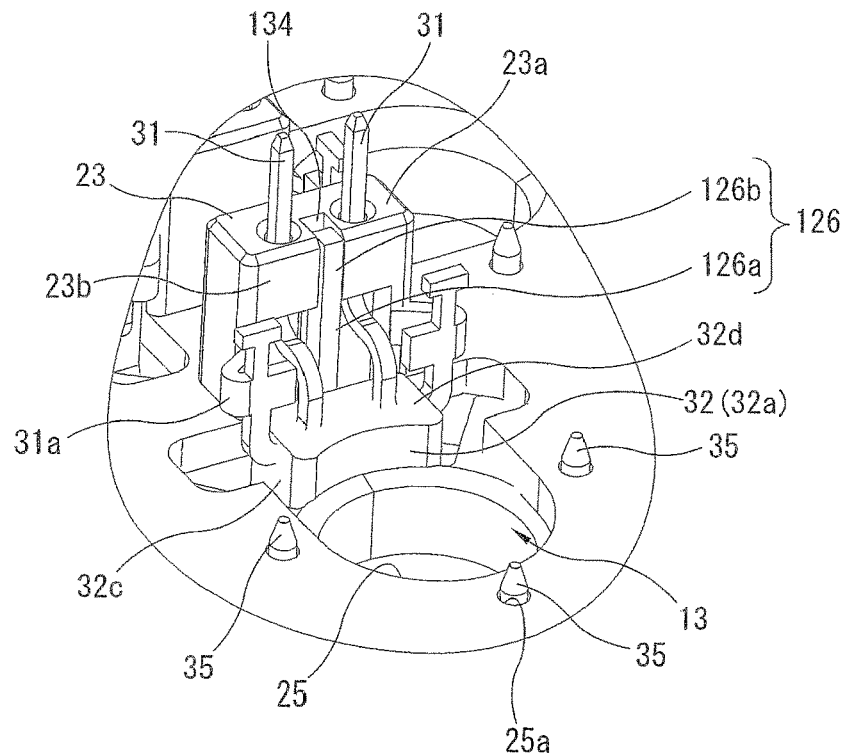
FIG. 15 is an enlarged view showing a Z portion in FIG. 14.
Figure 16:
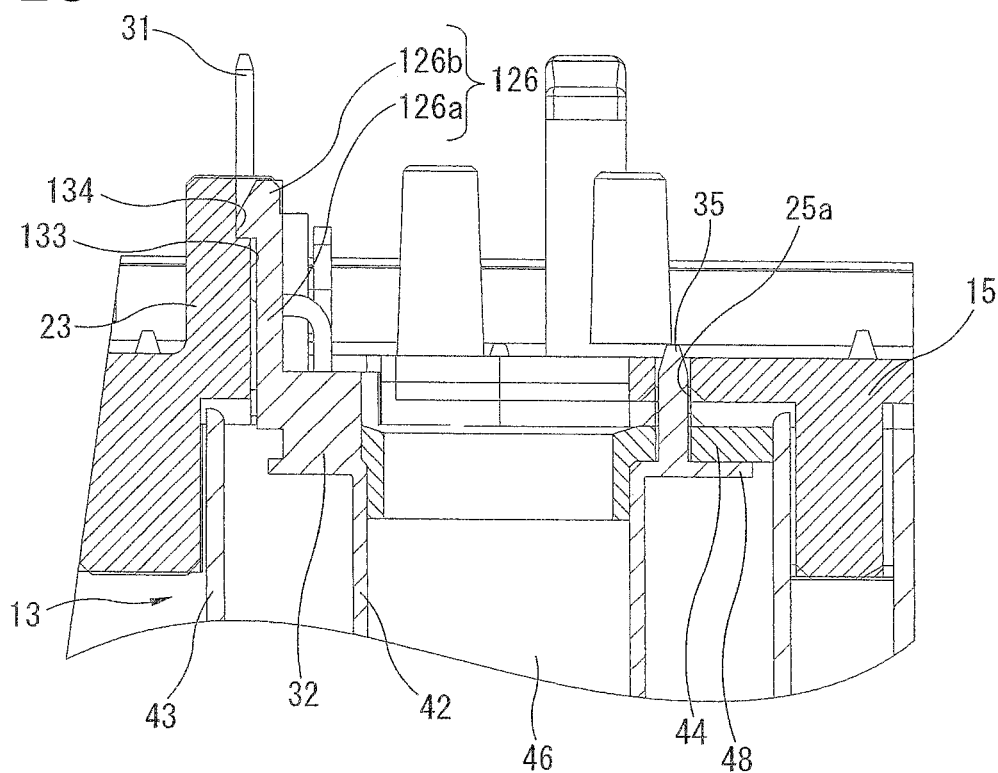
FIG. 16 is a sectional view showing the Z portion.
Figure 17:
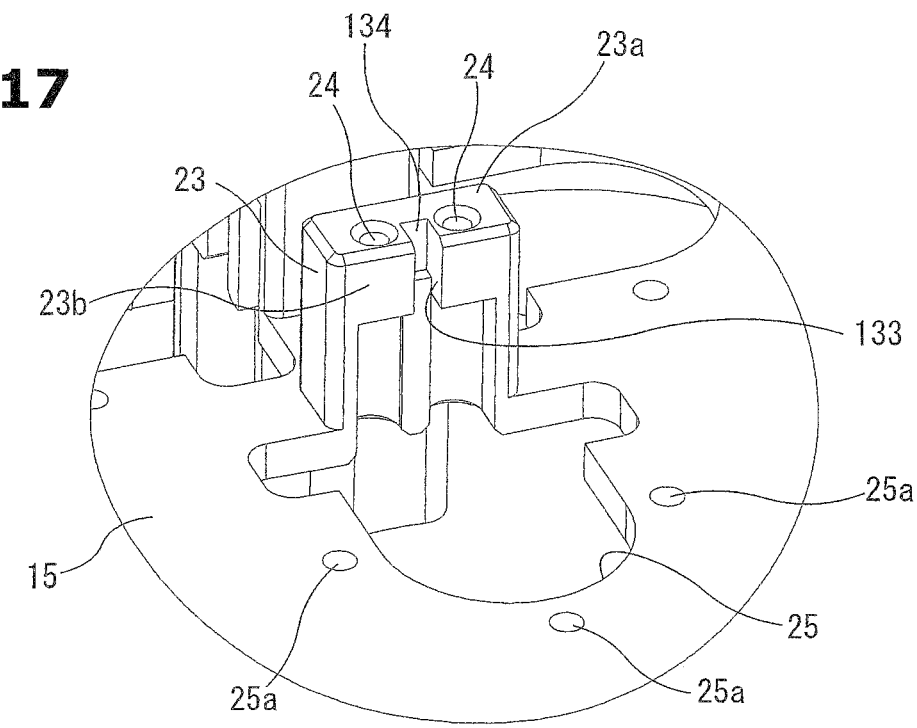
FIG. 17 is an enlarged view showing the Z portion in FIG. 14 before a coil assembly is attached.
Figure 18:
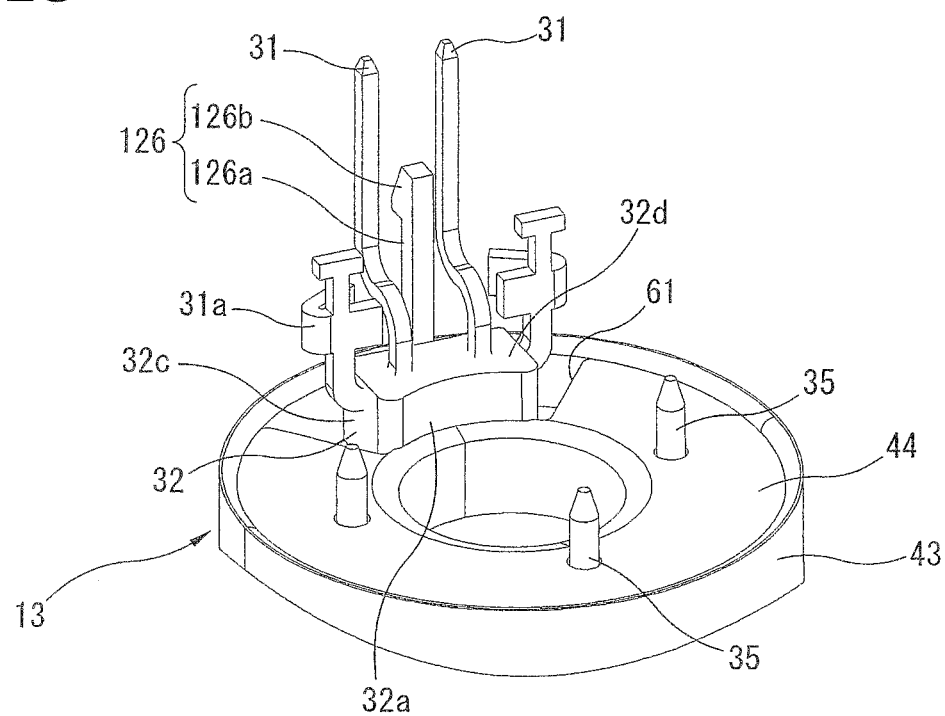
FIG. 18 is a perspective view showing a configuration of an end portion of the coil assembly.
Figure 19:
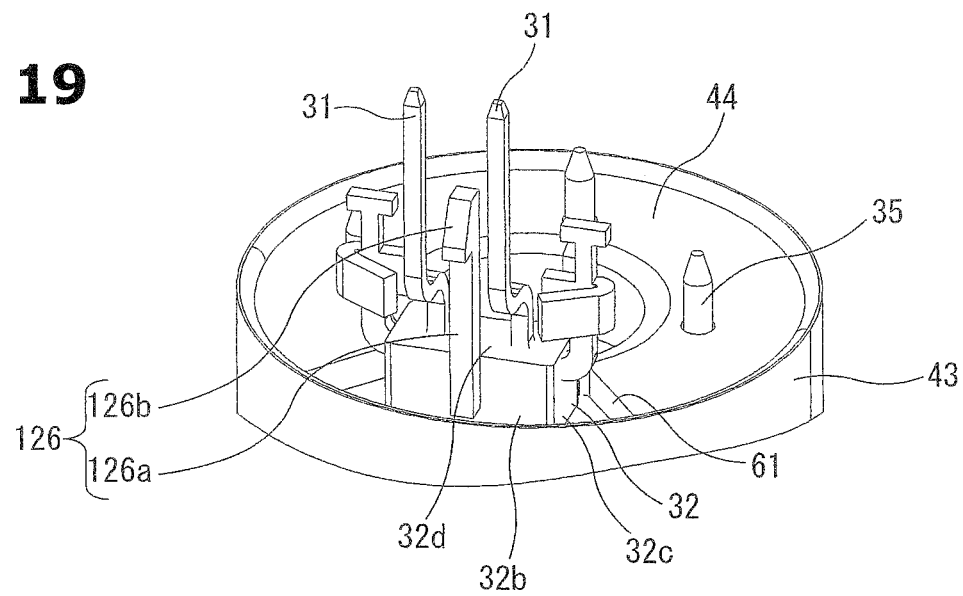
FIG. 19 is a perspective view when viewed from a direction different from that of FIG. 18.

FIG. 14 is a perspective view showing a configuration on the upper surface side of the body 3 in a state where the circuit board 17 is detached, similarly to FIG. 6. FIG. 15 is an enlarged view showing a Z portion in FIG. 14. FIG. 16 is a sectional view showing the Z portion. FIG. 17 is an enlarged view showing the Z portion in FIG. 14 before the coil assemblies 13 are mounted. FIG. 18 and FIG. 19 are perspective views showing the configuration of the end portion of the coil assembly 13 on the side of the second yoke 44.

In the above-described first embodiment, the "first engagement portion" on the coil assembly 13 side is the opening portion 34. The "second engagement portion" on the body 3 side is the coil support hook 26. In this second embodiment, the "first engagement portion" on the coil assembly 13 side is a coil support hook 126. The "second engagement portion" on the body 3 side is a recessed portion 134.

That is, the terminal support base portion 32 corresponding to the "wall portion" is formed on the coil bobbin 42 of the coil assembly 13, similarly to the first embodiment. The terminal support base portion 32 is formed to protrude on the end surface of the annular second flange 48, to have the arc wall shape curved along the opening edge of the shaft through hole 46. Specifically, the terminal support base portion 32 includes the inside surface 32a directing in the radially inside direction of the coil bobbin 42; the outside surface 32b directing in the radially outside direction of the coil bobbin 42; the pair of side surfaces 32c directing in a tangent direction of the coil bobbin 42; and the top surface 32d directing in the axial direction of the coil bobbin 42. The terminals 31 protrude from the top surface 32d. The wiring connection portions 31a protrudes, respectively, from the side surfaces 32c. The coil support hook 126 is provided on the outside surface 32b between the pair of the terminals 31. The coil support hook 126 extends in the axial direction of the coil bobbin 42. This coil support hook 126 is integrally molded with the terminal support base portion 32. The coil support hook 126 includes an arm portion 126a extending from the outside surface 32b beyond the top surface 32d in the axial direction of the coil bobbin 42; and a claw portion 126b provided at a tip end of this arm portion 126a. The claw portion 126b has a shape protruding in a wedge shape in the radially outside direction of the coil bobbin 42.

In this case, the terminal support base portion 32 and the coil support hook 126 are also positioned within a projection surface obtained by projecting the outer shape of the first yoke 43 in the axial direction of the coil bobbin 42.

A rectangular recessed portion 134 corresponding to this coil support hook 126 is provided on the side surface 23b of the terminal guide 23. The claw portion 126b is arranged to be engaged with the recessed portion 134. In the example shown in the drawings, the recessed portion 134 reaches the top surface 23a of the terminal guide 23. The terminal guide holes 24 are disposed on the top surface 23a on the both sides of the recessed portion 134. Moreover, a recessed groove 133 is formed below the recessed portion 134 (on the side of the coil assembly 13). The recessed groove 133 has a relatively short length. The recessed groove 133 is continuous with the recessed portion 134.

FIG. 14 to FIG. 17 exemplify the small terminal guide 23 which includes the rectangular top surface 23a, and which correspond to one of the three coil assemblies 13 arranged in a row. However, it is possible to employ the identical recessed portion 134 and recessed groove 133 in the above-described terminal guide 23 including the top surface 23a which has the substantially square shape corresponding to the pair of the coil assemblies 13 shown in FIG. 7 and FIG. 9.

Accordingly, the claw portion 126b of the coil support hook 126 is inserted into the recessed portion 134 while being guided by the recessed groove 133 of the terminal guide 23, by inserting the coil assembly 13 into the body 3, similarly to the above-described first embodiment. With this, the claw portion 126b is engaged with the recessed portion 134, so that the coil assembly 13 is held by the body 3. Similarly to the first embodiment, the coil assembly 13 includes the three pins 35. These pins 35 are mounted in the positioning holes 25a on the body 3 side.

Besides, the recessed groove 134 may be an opening portion reaching to the space inside the terminal guide 23.

In the thus-constructed second embodiment, it is possible to attain the effects and the operations which are identical to those in the first embodiment.

Other Embodiments

It is possible to use the engagement holding mechanism in the first embodiment and the engagement holding mechanism in the second embodiment, by arbitrarily combining these in one hydraulic control device including the plurality of the coil assemblies 13. That is, the engagement holding mechanism shown in the first embodiment is applied to some of the coil assemblies 13. The engagement holding mechanism shown in the second embodiment is applied to other of the coil assemblies 13.

Figure 20:
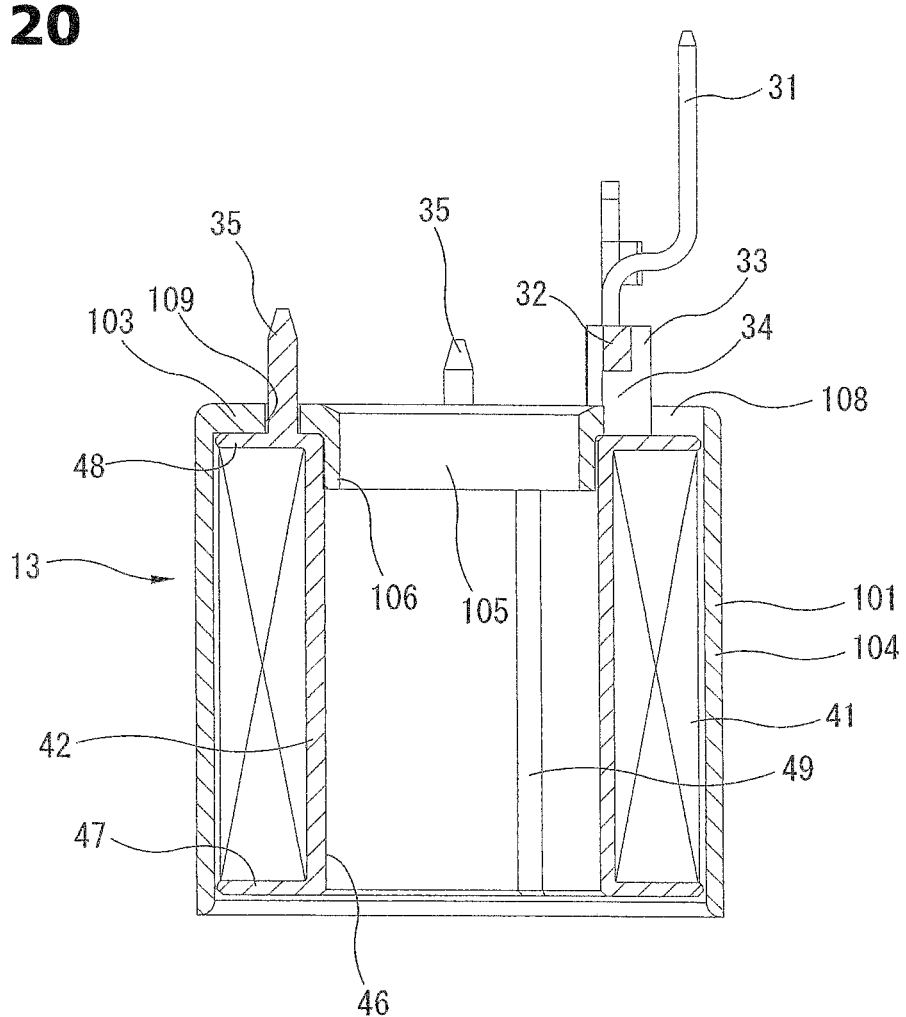
FIG. 20 is a sectional view showing a variation of a coil assembly.

Moreover, the configuration of the coil assembly 13 is not limited to the above-described embodiment. The coil assembly 13 can have other configurations. For example, FIG. 20 shows a coil assembly 13 including a single yoke 101 in place of the first yoke 43 and the second yoke 44 in the above-described embodiments. The yoke 101 includes an end wall portion 103 confronting the second flange 48 of the coil bobbin 42; and a side wall portion 104 which has a cylindrical shape, and which rises from a periphery of the end wall portion 103. A rising wall 106 is provided on an edge of the opening of a through hole 105. The rising wall 106 is press-fit in the shaft through hole 46 of the coil bobbin 42. The other end of the yoke 101, that is, the first flange 47 side of the coil bobbin 42 is opened. The terminal support base portion 32 protrudes through an arc opening portion 108 provided to the end wall portion 103, in the axial direction of the coil bobbin 42.

Moreover, the present invention is applicable to various coil assemblies.

Furthermore, the present invention is not limited to the above-described brake control device. The present invention is applicable to various hydraulic control devices in which a plurality of coil assemblies are disposed within a case.

[Aspects of Hydraulic Control Device]

For example, below-described aspects are conceivable as hydraulic control devices according to the embodiments.

In one aspect according to the present invention, a hydraulic control device includes: a plurality of coil assembles each including a coil bobbin, and a yoke which has a cylindrical shape, and which receives the coil bobbin; a case including a bottom wall, and receiving the coil assemblies arranged on one side of the bottom wall; a wall portion protruding from an end surface of the coil bobbin in an axial direction of the coil bobbin, within a projection surface obtained by projecting an outer shape of the yoke in the axial direction of the coil bobbin; a first engagement portion provided to the wall portion; and a second engagement portion provided to the case, and arranged to be engaged with the first engagement portion.

In a preferable aspect according to the present invention, the first engagement portion is a recessed portion or an opening portion; and the second engagement portion is a hook which includes a claw portion provided at a tip end portion of the hook, and which is arranged to be engaged with the recessed portion or the opening portion.

In another aspect according to the present invention, the first engagement portion is a hook including a claw portion provided at a tip end of the hook; and the second engagement portion is a recessed portion or an opening portion with which the claw portion is arranged to be engaged.

In these aspects, preferably, a recessed groove is provided to be continuous with the recessed portion or the opening portion; and the recessed groove is arranged to guide the claw portion.

In a preferable aspect according to the present invention, the wall portion is a terminal support base portion formed to protrude from a flange of one end of the coil bobbin; and the terminal support base portion supports a pair of terminals.

Preferably, the first engagement portion is provided to the terminal support base portion between a pair of the terminals.

In a preferable aspect according to the present invention, the bottom wall includes terminal guides each of which rises from the bottom wall, and each of which includes a terminal guide hole formed on a top surface of the each terminal guide; and the second engagement portion is formed on a side surface of each of the terminal guides.

In one aspect, one of the terminal guides is disposed between two of the coil assemblies which are adjacent to each other, and which are combined in a posture in which the terminals of the two of the coil assemblies are adjacent to each other; the one of the terminal guides includes four terminal guide holes into which the terminals of the two of the coil assemblies are inserted; and each of the terminals of the coil assemblies is bent to be directed to one of the terminal guide holes.

In a preferable aspect according to the present invention, a plurality of pins are provided on the end surface of the coil assembly; and the pins are engaged, respectively, with positioning holes of the bottom wall.

Moreover, the present invention is constituted as the brake control device. In a preferable aspect according to the present invention, a brake control device includes: a hydraulic block including a fluid passage which is a part of a brake pipe; a solenoid valve which includes a valve element inserted into a valve insertion hole of the block, and a coil assembly arranged to drive the valve element, and which is arranged to control a flow rate of the fluid passage; a circuit board including an electric circuit for driving the solenoid valve; and a case receiving the coil assembly and the circuit board, the coil assembly including; a coil bobbin around which a coil is wound, a yoke having a cylindrical shape, and receiving the coil bobbin, a terminal which protrudes from an end portion of the coil bobbin in an axial direction of the coil bobbin, and which is fixed and supported on the circuit board, a wall portion protruding from an end surface of the coil bobbin in an axial direction of the coil bobbin, within a projection surface obtained by projecting an outer shape of the yoke in the axial direction of the coil bobbin, and a first engagement portion provided to the wall portion, the coil assembly being held in the case by an engagement between the first engagement portion and a second engagement portion provided to the case.

The invention claimed is:

1. A hydraulic control device comprising:
   a plurality of coil assembles each including a coil bobbin, and a yoke which has a cylindrical shape, and which receives the coil bobbin;
   a case including a bottom wall, and receiving the coil assemblies arranged on one side of the bottom wall;
   a wall portion protruding from an end surface of the coil bobbin in an axial direction of the coil bobbin, within a projection surface obtained by projecting an outer shape of the yoke in the axial direction of the coil bobbin;
   a first engagement portion provided to the wall portion, within the projection surface obtained by projecting the outer shape of the yoke in the axial direction of the coil bobbin; and
   a second engagement portion provided to the case, and arranged to be engaged with the first engagement portion,
   wherein the wall portion is a terminal support base portion formed to protrude from a flange of one end of the coil bobbin, and the terminal support base portion supports a pair of terminals,
   wherein the first engagement portion is provided to the terminal support base portion between the pair of terminals.

2. The hydraulic control device as claimed in claim 1, wherein the first engagement portion is a recessed portion or an opening portion; and the second engagement portion is a hook which includes a claw portion provided at a tip end portion of the hook, and which is arranged to be engaged with the recessed portion or the opening portion.

3. The hydraulic control device as claimed in claim 1, wherein the first engagement portion is a hook including a claw portion provided at a tip end of the hook; and the second engagement portion is a recessed portion or an opening portion with which the claw portion is arranged to be engaged.

4. The hydraulic control device as claimed in claim 2, wherein a recessed groove is provided to be continuous with the recessed portion or the opening portion; and the recessed groove is arranged to guide the claw portion.

5. The hydraulic control device as claimed in claim 1, wherein the bottom wall includes terminal guides each of which rises from the bottom wall, and each of which includes a terminal guide hole formed on a top surface of the each terminal guide; and the second engagement portion is formed on a side surface of each of the terminal guides.

6. The hydraulic control device as claimed in claim 5, wherein one of the terminal guides is disposed between two of the coil assemblies which are adjacent to each other, and which are combined in a posture in which the terminals of the two of the coil assemblies are adjacent to each other; the one of the terminal guides includes four terminal guide holes into which the terminals of the two of the coil assemblies are inserted; and each of the terminals of the coil assemblies is bent to be directed to one of the terminal guide holes.

7. The hydraulic control device as claimed in claim 1, wherein a plurality of pins are provided on the end surface of the coil assembly; and the pins are engaged, respectively, with positioning holes of the bottom wall.

8. A brake control device comprising:
   a hydraulic block including a fluid passage which is a part of a brake pipe;
   a solenoid valve which includes a valve element inserted into a valve insertion hole of the block, and a coil assembly arranged to drive the valve element, and which is arranged to control a flow rate of the fluid passage;
   a circuit board including an electric circuit for driving the solenoid valve; and
   a case receiving the coil assembly and the circuit board, the coil assembly including;
      a coil bobbin around which a coil is wound,
      a yoke having a cylindrical shape, and receiving the coil bobbin,
      a terminal which protrudes from an end portion of the coil bobbin in an axial direction of the coil bobbin, and which is fixed and supported on the circuit board,
      a wall portion protruding from an end surface of the coil bobbin in an axial direction of the coil bobbin, within a projection surface obtained by projecting an outer shape of the yoke in the axial direction of the coil bobbin, and
      a first engagement portion provided to the wall portion, within the projection surface obtained by projecting the outer shape of the yoke in the axial direction of the coil bobbin,
      the coil assembly being held in the case by an engagement between the first engagement portion and a second engagement portion provided to the case,
      wherein the wall portion is a terminal support base portion formed to protrude from a flange of one end of the coil bobbin, and the terminal support base portion supports a pair of terminals, wherein the first engagement portion is provided to the terminal support base portion between the pair of terminals.

\* \* \* \* \*